US012006210B2

United States Patent
Fathalizadeh et al.

(10) Patent No.: US 12,006,210 B2
(45) Date of Patent: Jun. 11, 2024

(54) SYSTEM AND METHODS FOR FABRICATING BORON NITRIDE NANOSTRUCTURES

(71) Applicant: THE REGENTS OF THE UNIVERSITY OF CALIFORNIA, Oakland, CA (US)

(72) Inventors: Aidin Fathalizadeh, Berkeley, CA (US); Thang Pham, Berkeley, CA (US); William Mickelson, Albany, CA (US); Alexander Zettl, Kensington, CA (US)

(73) Assignee: The Regents of the University of California, Oakland, CA (US)

( * ) Notice: Subject to any disclaimer, the term of this patent is extended or adjusted under 35 U.S.C. 154(b) by 129 days.

(21) Appl. No.: 17/661,805

(22) Filed: May 3, 2022

(65) Prior Publication Data
US 2022/0281743 A1  Sep. 8, 2022

Related U.S. Application Data

(62) Division of application No. 15/321,177, filed as application No. PCT/US2015/037448 on Jun. 24, 2015, now Pat. No. 11,345,595.
(Continued)

(51) Int. Cl.
*C01B 21/064* (2006.01)
*B01J 19/08* (2006.01)
(Continued)

(52) U.S. Cl.
CPC ........... *C01B 21/0641* (2013.01); *B01J 19/08* (2013.01); *B82Y 40/00* (2013.01); *C01B 21/064* (2013.01);
(Continued)

(58) Field of Classification Search
CPC ... C25D 13/22; C01B 21/0641; C01B 21/064; B01J 19/08; B01J 2219/0879;
(Continued)

(56) References Cited

U.S. PATENT DOCUMENTS

| 3,706,652 A | 12/1972 | Hamblyn et al. |
| 4,431,901 A | 2/1984 | Hull |

(Continued)

FOREIGN PATENT DOCUMENTS

| CN | 101587902 B | 11/2009 |
| WO | WO 02/092503 | 11/2002 |

(Continued)

OTHER PUBLICATIONS

Blackburn, JL et al. Synthesis and Characterization of Boron-Doped Single-Wall Carbon Nanotubes Produced by the Laser Vaporization Technique. Chem. Mater. Apr. 14, 2006;pp. 2558-2566.
(Continued)

*Primary Examiner* — Xiuyu Tai
(74) *Attorney, Agent, or Firm* — Knobbe, Martens, Olson & Bear, LLP

(57) ABSTRACT

This disclosure provides systems, methods, and apparatus related to boron nitride nanomaterials. In one aspect, a method includes generating a directed flow of plasma. A boron-containing species is introduced to the directed flow of the plasma. Boron nitride nanostructures are formed in a chamber. In another aspect, a method includes generating a directed flow of plasma using nitrogen gas. A boron-containing species is introduced to the directed flow of the plasma. The boron-containing species can consist of boron powder, boron nitride powder, and/or boron oxide powder. Boron nitride nanostructures are formed in a chamber, with a pressure in the chamber being about 3 atmospheres or greater.

17 Claims, 8 Drawing Sheets

Related U.S. Application Data

(60) Provisional application No. 62/140,553, filed on Mar. 31, 2015, provisional application No. 62/019,767, filed on Jul. 1, 2014, provisional application No. 62/017,038, filed on Jun. 25, 2014.

(51) Int. Cl.
  *B82Y 40/00* (2011.01)
  *C04B 35/583* (2006.01)
  *C04B 35/622* (2006.01)
  *B82Y 30/00* (2011.01)

(52) U.S. Cl.
  CPC .......... *C04B 35/583* (2013.01); *C04B 35/622* (2013.01); *B01J 2219/0879* (2013.01); *B01J 2219/0894* (2013.01); *B82Y 30/00* (2013.01); *C01P 2002/82* (2013.01); *C01P 2004/03* (2013.01); *C01P 2004/04* (2013.01); *C01P 2004/13* (2013.01); *C01P 2004/24* (2013.01); *C04B 2235/5276* (2013.01); *C04B 2235/5284* (2013.01); *C04B 2235/5454* (2013.01); *C04B 2235/767* (2013.01); *C04B 2235/95* (2013.01); *Y10S 977/762* (2013.01); *Y10S 977/896* (2013.01)

(58) Field of Classification Search
  CPC .............. B01J 2219/0894; B01J 19/088; B01J 2219/0809; B01J 2219/0898; B01J 10/005; B82Y 40/00; B82Y 30/00; C04B 35/583; C04B 35/622; C04B 2235/5276; C04B 2235/5284; C04B 2235/5454; C04B 2235/767; C04B 2235/95; C04B 35/6229; C01P 2002/82; C01P 2004/03; C01P 2004/04; C01P 2004/13; C01P 2004/24; C01P 2002/88; C01P 2004/133; Y10S 977/762; Y10S 977/896; Y10S 977/831; D01F 9/08; G06F 3/0484; H04L 41/22; H04L 41/0813; H04L 63/083
  See application file for complete search history.

(56) References Cited

U.S. PATENT DOCUMENTS

| | | | |
|---|---|---|---|
| 8,206,674 B2 | 6/2012 | Smith et al. | |
| 8,673,120 B2 | 3/2014 | Whitney et al. | |
| 9,394,632 B2 | 7/2016 | Zett | |
| 11,345,595 B2 | 5/2022 | Fathalizadeh et al. | |
| 2006/0051505 A1* | 3/2006 | Kortshagen | C30B 7/005 427/212 |
| 2007/0266825 A1* | 11/2007 | Ripley | C01B 32/162 422/186 |
| 2009/0117021 A1 | 5/2009 | Smith et al. | |
| 2010/0108981 A1 | 5/2010 | Jayasekara | |
| 2012/0261390 A1 | 10/2012 | Boulos et al. | |
| 2012/0313269 A1 | 12/2012 | Kear et al. | |
| 2014/0272170 A1* | 9/2014 | Hales | C01B 21/064 427/446 |
| 2015/0125374 A1 | 5/2015 | Smith et al. | |
| 2016/0272496 A1 | 9/2016 | Smith et al. | |
| 2017/0044016 A1* | 2/2017 | Smith | B82Y 30/00 |
| 2017/0253485 A2 | 9/2017 | Kim et al. | |

FOREIGN PATENT DOCUMENTS

| | | |
|---|---|---|
| WO | WO 14/169382 | 10/2014 |
| WO | WO 15/066428 | 5/2015 |

OTHER PUBLICATIONS

Blase, X.; Rubio, A.; Louie, S. G.; Cohen, M. L. Europhys Lett 1994, 28, (5), 335-340.
Chang, C. W.; Han, W. Q.; Zetil, A. Appl Phys Lett 2005, 86, (17).
Chen, X et al. Preparation and Electrochemical Hydrogen Storage of Boron Nitride Nanotubes. J. Phys. Chem. Apr. 12, 2005; pp. 11525.
Chen, X.; Wu, P.; Rousseas, M.; Okawa, D.; Gartner, Z.; Zettl, A.; Bertozzi, C. R. J Am Chem Soc 2009, 131, (3), 890-891.
Chen, Y.; Chadderton, L. T.; FitzGerald, J.; Williams, J. S. Appl Phys Lett 1999, 74, (20), 2960-2962.
Chopra, N. G.; Luyken, R. J.; Cherrey, K.; Crespi, V. H.; Cohen, M. L.; Louie, S. G.; Zettl, A. Science 1995, 269, (5226), 966-967.
Chopra, N. G.; Zetll, A. Solid State Commun 1998, 105, (5), 297-300.
Cohen, M. L.; Zettl, A. Phys Today 2010, 63, (11), 34-38.
Cumings, J.; Zettl, A. Chem Phys Lett 2000, 316, (3-4), 211-216.
Cumings, J.; Zettl, A. Solid State Commun 2004, 129, (10), 661-664.
Erickson, K. J.; Gibb, A. L.; Sinitskil, A.; Rousseas, M.; Alem, N.; Tour, J. M.; Zettl, A. K. Nano Lett 2011, 11, (8), 3221-3226.
Fathalizadeh et al., Scaled Synthesis of Boron Nitride Nanotubes, Nanoribbons, and Nanococoons Using Direct Feedstock Injection into an Extended-Pressure, Inductively-Coupled Thermal Plasma, American Chemical Society, Nono Lett., 2014, 14, pp. 4881-4886.
Golberg, D.; Bando, Y.; Eremets, M.; Takemura, K.; Kurashima, K.; Yusa, H. Appl Phys Lett 1996, 69, (14), 2045-2047.
Guo, J et al. Development of Nanopowder Synthesis Usinginduction Plasma, Plasma Science and Technology. Apr. 2010.
Han, W. Q.; Mickelson, W.; Cumings, J.; Zettl, A. Appl Phys Lett 2002, 81, (6), 1110-1112.
Hilder, T. A.; Gordon, D.; Chung, S. H. Small 2009, 5, (19), 2183-2190.
Iijima, S. Nature 1991, 354, (6348), 56-58.
Ishigami, M.; Sau, J. D.; Aloni, S.; Cohen, M. L.; Zettl, A. Phys Rev Lett 2005, 94, (5).
Jaffrennou, P.; Barjon, J.; Lauret, J. S.; Maguer, A.; Golberg, D.; Attal-Trétout, B.; Ducastelle, F.; Loiseau, A. physica status solidi (b) 2007, 244, (11), 4147-4151.
Keun Su, K.; German, C.-S.; Christopher, T. K.; Matej, I.; Benoit, S.; Gervais, S. Journal of Physics D: Applied Physics 2007, 40, (8), 2375-2387.
Kim, KS et al. Hydrogen-Catalyzed, Pilot-Scale Production of Small-Diameter Boron Nitride Nanotubes and Their Macroscopic Assemblies. ACS Nano. May 2014.
Kim, Y. H.; Chang, K. J.; Louie, S. G. Phys Rev B 2001, 63, (20).
Lahiri, D.; Hadjikhani, A.; Zhang, C.; Xing, T.; Li, L. H.; Chen, Y.; Agarwal, A. Materials Science and Engineering: A 2013, 574, (0), 149-156.
Loiseau, A.; Willaime, F.; Demoncy, N.; Hug, G.; Pascard, H. Phys Rev Lett 1996, 76, (25), 4737-4740.
Lourie, O. R.; Jones, C. R.; Bartlett, B. M.; Gibbons, P. C.; Ruoff, R. S.; Buhro, W. E. Chem Mater 2000, 12, (7), 1808-+.
Mele, E. J.; Král, P. Phys Rev Lett 2002, 88, (5), 056803.
Mickelson, W.; Aloni, S.; Han, W. Q.; Cumings, J.; Zettl, A. Science 2003, 300, (5618), 467-469.
Miyamoto, Y.; Rubio, A.; Cohen, M. L.; Louie, S. G. Phys Rev B 1994, 50, (7), 4976-4979.
Nemanich, R. J.; Solin, S. A.; Martin, R. M. Phys Rev B 1981, 23, (12), 6348-6356.
Rubio, A.; Corkill, J. L.; Cohen, M. L. Phys Rev B 1994, 49, (7), 5081-5084.
Shimizu, Y.; Moriyoshi, Y.; Tanaka, H.; Komatsu, S. Appl Phys Lett 1999, 75, (7), 929-931.
Smith, M. W.; Jordan, K. C.; Park, C.; Kim, J. W.; Lillehei, P. T.; Crooks, R.; Harrison, J. S. Nanotechnology 2009, 20, (50), pp. 1-6.
Tang, C.; Bando, Y.; Ding, X.; Qi, S.; Golberg, D. J Am Chem Soc 2002, 124, (49), 14550-14551.
Terrones, M. Ann. Rev. Mater. Res. 2003, 33, 419-501.
Wang et al. Recent advancements in boron nitride nanotubes, Nanoscale, 2010, 2, pp. 2028-2034.
Weng-Sieh, Z.; Cherrey, K.; Chopra, N. G.; Blase, X.; Miyamoto, Y.; Rubio, A.; Cohen, M. L.; Louie, S. G.; Zettl, A.; Gronsky, R. Phys Rev B 1995, 51, (16), 11229-11232.
Wu, J.; Han, W.-Q.; Walukiewicz, W.; Ager, J. W.; Shan, W.; Haller, E. E.; Zetil, A. Nano Lett 2004, 4, (4), 647-650.

(56) References Cited

OTHER PUBLICATIONS

Zhi, C. Y.; Bando, Y.; Tan, C. C.; Golberg, D. Solid State Commun 2005, 135, (1-2), 67-70.
Zhi, C.; Bando, Y.; Tang, C.; Honda, S.; Kuwahara, H.; Golberg, D. Journal of Materials Research 2006, 21, (11), 2794-2800.
International Search Report and The Written Opinion of International Application No. PCT/US2015/037448 dated Sep. 15, 2015.

\* cited by examiner

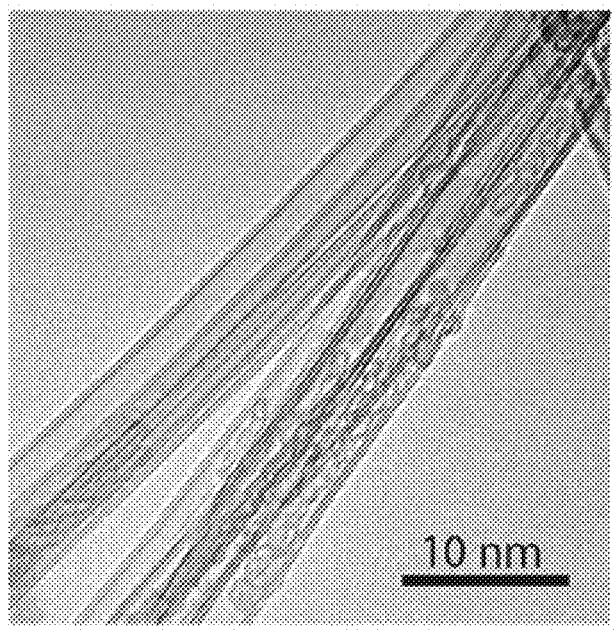
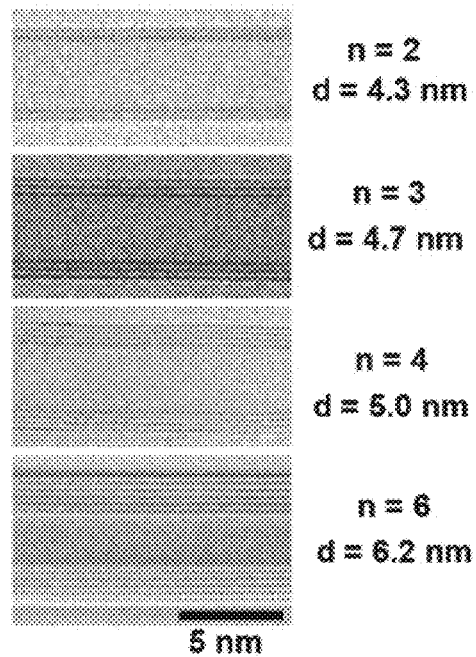
Figure 4A                                        Figure 4B

SYSTEM AND METHODS FOR FABRICATING BORON NITRIDE NANOSTRUCTURES

CROSS-REFERENCE TO RELATED APPLICATIONS

This application is a divisional application of and claims the benefit of priority to U.S. application Ser. No. 15/321,177, filed Dec. 21, 2016, which in turn is the U.S. National Phase of and claims the benefit of priority to International Application No. PCT/US2015/037448 entitled SYSTEM AND METHODS FOR FABRICATING BORON NITRIDE NANOSTRUCTURES, filed Jun. 24, 2015 and published on Dec. 30, 2015 as WO 2015/200496, which claims the benefit of priority to U.S. Provisional Application Nos. 62/017,038, filed Jun. 25, 2014; 62/019,767, filed Jul. 1, 2014; and 62/140,553, filed Mar. 31, 2015, all of which are incorporated herein by reference in their entirety.

STATEMENT OF GOVERNMENT SUPPORT

This invention was made with government support under Contract No. DE-AC02-05CH11231 awarded by the U.S. Department of Energy and Grant No. EEC-0832819 awarded by the National Science Foundation. The government has certain rights in this invention.

TECHNICAL FIELD

This disclosure relates generally to boron nitride (BN) nanomaterials and more particularly to systems and methods for fabricating boron nitride nanostructures.

BACKGROUND

Boron nitride nanotubes (BNNTs), first synthesized in 1995 by Zettl and collaborators, are wide-bandgap structural analogs to carbon nanotubes. Importantly, the special chemical, optical, thermal, and radiation-absorption properties of BNNTs make them superior to their carbon counterparts for many applications. Theoretical and experimental studies demonstrate that the electronic energy bandgap is ~5 eV, independent of tube diameter and chirality, but can be tuned by the application of transverse electric fields. A host of other BNNT properties have been considered, including tunable thermal conductivity, piezoelectricity, biocompatibility, hosts for silocrystal structures, electron field emission, water purification, and reinforcements for structural composites, to name just a few.

SUMMARY

A variable pressure (e.g., to 10 atmospheres), powder/gas/liquid injection inductively coupled plasma system has been developed and used to produce high quality boron nitride nanotubes (BNNTs) at continuous production rates of about 35 g/hour. Under suitable conditions, collapsed boron nitride nanotubes (i.e., nanoribbons), closed shell boron nitirde capsules (i.e., nanococoons), and nanosheets are also obtained. The process is adaptable to a large variety of feedstock materials.

One innovative aspect of the subject matter described in this disclosure can be implemented in a method including generating a directed flow of plasma. A boron-containing species is introduced to the directed flow of the plasma. Boron nitride nano structures are formed. In one embodiment, the boron nitride nanostructures are formed in a chamber.

Another innovative aspect of the subject matter described in this disclosure can be implemented in a method including generating a directed flow of plasma using nitrogen gas. A boron-containing species is introduced to the directed flow of the plasma. The boron-containing species consists of boron powder. Boron nitride nanostructures are formed in a chamber, with a pressure in the chamber being about 3 atmospheres or greater.

Another innovative aspect of the subject matter described in this disclosure can be implemented in a system including a chamber and an inductively coupled plasma-generating torch attached to the chamber. The system is configured to: (a) generate a directed flow of plasma with the inductively coupled plasma-generating torch using nitrogen gas, a pressure in the chamber being about 3 atmospheres or greater; (b) introduce a boron-containing species to the directed flow of the plasma; and (c) form boron nitride nanostructures in the chamber.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4A and 4B show example of high resolution TEM images of BNNTs produced by EPIC synthesis.

DETAILED DESCRIPTION

Figure 1:
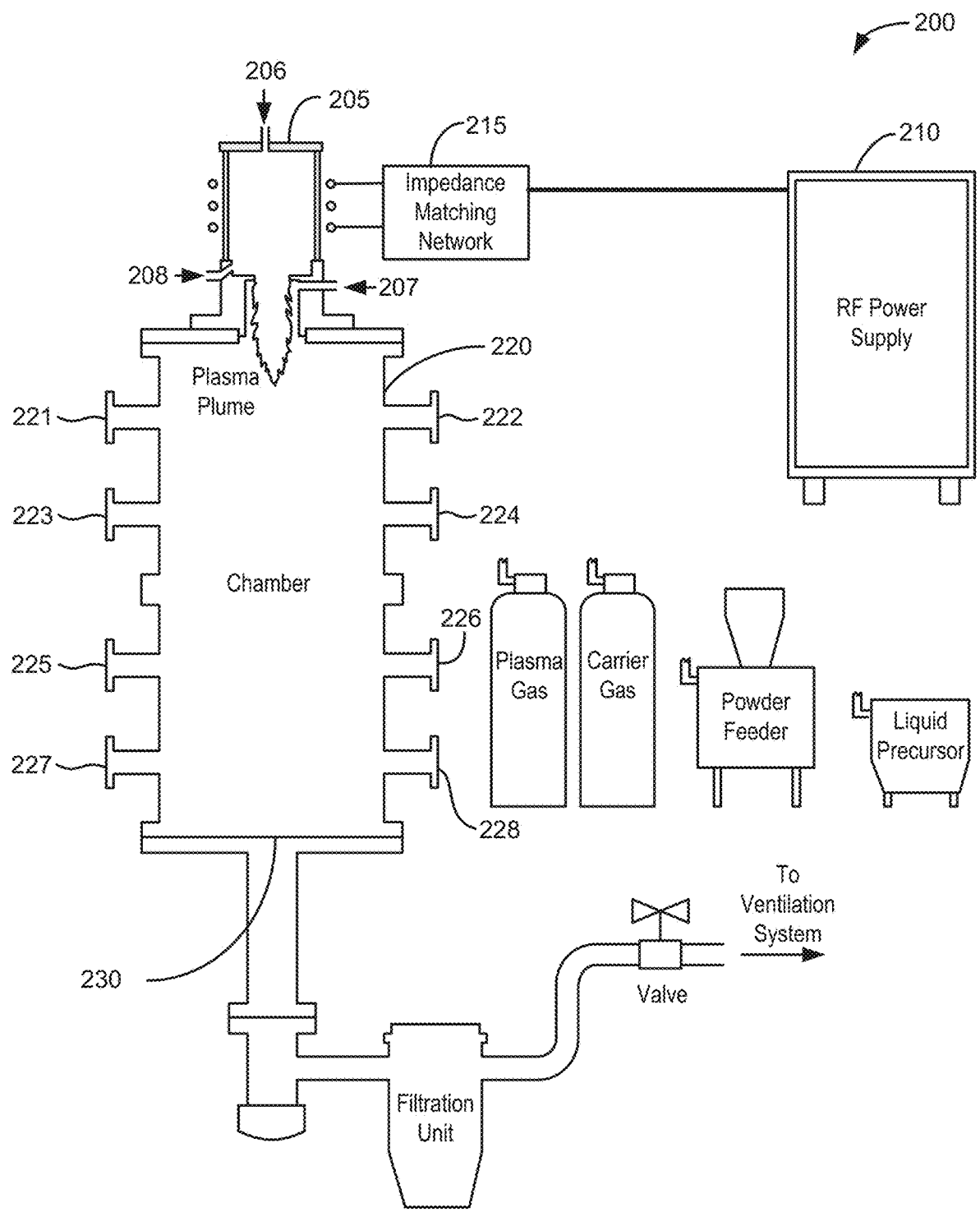
FIG. 1 shows an example of a cross-sectional schematic illustration of an Extended Pressure Inductively Coupled (EPIC) synthesis system.

Reference will now be made in detail to some specific examples of the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Introduction

An unfortunate constraint that has severely limited the scientific study and industrial application of BNNTs and related BN-based nanostructures (e.g., such as BN nanoribbons (BNNRs), BN nanococoons (BNNCs), and BN nanosheets) is the general lack of availability of the synthesized materials. The original arc-plasma synthesis method of BNNTs has seen some refinements, but generally it is not readily scalable. Other synthesis methods have been advanced, including laser vaporization, chemical vapor deposition, plasma torch, ball milling and annealing, and templated conversion. Another technique in BNNT synthesis is the use of a laser ablation technique to create small-wall-number, highly crystalline, and high aspect ratio pure BNNTs. Unfortunately, this laser-vaporization method suffers from low energy efficiency as well as limited throughput (approximately 100 mg/hour).

System and Methods

The operation of a high-throughput, scalable BN nanostructure synthesis process whereby precursor materials are directly and continuously injected into a high-temperature, Extended Pressure Inductively Coupled (EPIC) plasma synthesis system is described herein. The EPIC synthesis system is versatile in terms of synthesis parameters and allows for the injection of fluids (e.g., gases or liquids) and solids (e.g., powders) directly into a variable-power plasma plume. In addition, the high-pressure capability of the plasma (e.g., up to 10 atm) allows for shifts in chemical reactions. The system can be operated in a near-continuous fashion and thus far has achieved a record output of over 35 g/hour for pure, small diameter, few wall, highly crystalline BNNTs.

Inductively coupled thermal plasma systems typically operate at reduced pressure (e.g., 1 atmosphere and below). Further, inductively coupled thermal plasma systems typically operate using argon (Ar) gas to generate a plasma, as it has been thought difficult to maintain a plasma in such a system with nitrogen ($N_2$) gas. Nitrogen is a diatomic gas, while a more conventional plasma gas, such as argon, is monoatomic. Plasmas are generally more difficult to maintain with diatomic gasses in part because of the dissociation energy of the diatomic gas. No commercial system existed that was capable of operating within the parameter ranges described herein (e.g., including high pressure, pure nitrogen operation). Therefore, a suitable EPIC synthesis system was designed and built.

FIG. 1 shows an example of a cross-sectional schematic illustration of an Extended Pressure Inductively Coupled (EPIC) synthesis system 200 for scaled synthesis of BNNTs and related materials. An inductively coupled plasma-generating torch 205, driven by a power supply 210 and a matching network 215, is attached to a chamber 220. In some embodiments, the inductively coupled plasma-generating torch 205 is powered with a power supply 210 that is an AC power supply. In contrast, a DC arc plasma torch is powered with a DC power supply. In some embodiments, an inductively coupled plasma is advantageous in the fabrication of boron nitride nanomaterials, because of the larger plasma volume, the low plasma gas velocity, and the longer reaction time associated with an inductively coupled plasma. Due to the absence of electrodes in an inductively coupled plasma-generating torch, an inductively coupled plasma-generating torch may be relatively maintenance free and does not introduce contamination from electrodes in the materials being fabricated; a DC arc plasma torch does have electrodes. Further, an inductively coupled plasma-generating torch may offer greater flexibility in the control of the operating parameters compared to a DC arc plasma torch.

For example, for a laboratory-scale embodiment of the system 200, the power supply 210 may be a 60 kW, 7 MHz power supply and the chamber 220 may have a 15 centimeters (cm) inner diameter and be 112 cm long. All of the experiments described in the EXAMPLES section were performed with such a laboratory-scale embodiment. A larger system, including a larger chamber and a more powerful power supply, may be used in an industrial implementation of an EPIC synthesis system.

In some embodiments, the plasma-generating torch 205 includes a plasma chamber of a dielectric material (e.g., a high-temperature dielectric material). In some embodiments, the dielectric material of the plasma chamber comprises quartz or alumina (i.e., aluminum oxide). In some embodiments, the plasma chamber is a composite structure, with an inner water-cooled porous structure surrounded by an alumina cylinder. In some embodiments, coils configured to be driven by a radio frequency signal are wrapped around the plasma chamber.

In some embodiments, the plasma-generating torch 205 includes several ports for the introduction of materials. Ports 206, 207, and 208 in the plasma-generating torch 205 may be used for injection of plasma gas and/or feedstock near the plasma plume. For example, the plasma gas (e.g., nitrogen or a mixture of nitrogen and argon) can be introduced at the port 206, and boron feedstock (e.g., boron powder, boron nitride, boron carbide, boron trioxide, boric acid, or a mixture of carbonaceous material and an oxide of boron) can be injected into the plasma plume via the port 207. Other modes of operation are possible, such as co-injection of the plasma gas and boron feedstock through the port 206, or introducing the plasma gas through the port 208 where the gas first swirls upward along the inner wall of the torch body and then back down the center. Powder feedstock can be input using a commercial powder feeder using a carrier gas, while liquids/gases can be directly injected.

Several access ports in the chamber 220 may provide access to the interior of the chamber 220. For example, access ports 221-228 may be used for diagnostics (e.g., such as optical monitoring of the reaction), for the insertion of quench modifiers (e.g., such as wires or meshes), or for pressure-assisted purging of synthesized material. In some embodiments, the chamber 220 may include fewer access ports, more access ports, or no access ports.

In some embodiments, due to the flow of nitrogen or other gasses used to generate a plasma with the plasma-generating torch 205, the chamber 220 includes a port 230 though which gasses may be vented. Fixtures (e.g., a valve, a needle valve, or a gas metering device) associated with the port 230 may be adjusted to maintain a desired pressure in the chamber 220.

In some embodiments, the system 200 (e.g., the power supply 210, the plasma-generating torch 205, and the chamber 220) may be actively cooled when in operation to allow for continuous operation and to aid in ensuring suitable thermal quench gradients within the chamber 220. In some embodiments, the system 200 may be water-cooled.

In some embodiments, synthesized material can be collected manually from the opened chamber 220. In some embodiments, synthesized material can be collected via an in-situ pressure-purge extraction cycle, which may afford near-continuous (i.e., rather than batch) operation. For example, additional vessels may be attached to ports 221-228 with valves between these vessels and the chamber 220. By pressuring and/or evacuating these vessels, the synthesized material can be driven from the main chamber 220 by opening the valves and forcing the synthesized material into various vessels for collection. In some embodiments, the synthesized materials can be collected on, for example, a wire or wire mesh that is introduced into the chamber through one of the ports (221-228) and out of the chamber through another port (221-228) to a vessel where it can be collected.

The power density and volume of the plasma plume, which have bearing on the temperature, residence time of precursor materials, and quench rates in the reaction zone, can be modified at a given pressure by varying the input power and gas flow rates. Quench rates may be further adjusted by varying the cooling of the chamber 220 (e.g., by adjusting the cooling water flow rate) or by lining the interior wall of the chamber 220 with thermal blankets (e.g., in some runs described in the EXAMPLES section, carbon felt of about 1.3 cm thickness was used). For a typical run described in the EXAMPLES section, the plasma gas was pure $N_2$ injected into port 206, and the boron feedstock was pure boron powder or hexagonal boron nitride (hBN) powder injected via a powder feeder and pure $N_2$ carrier gas into port 207.

Figure 1A:
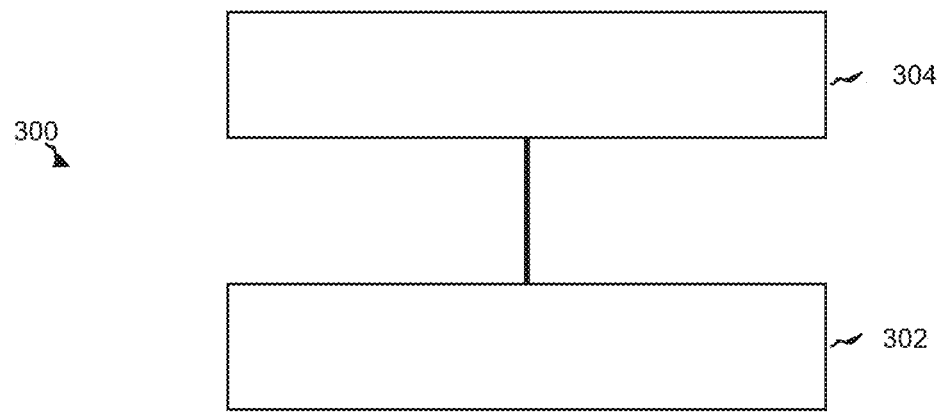
FIG. 1A shows an example illustration of an EPIC synthesis system including a system controller.

In some embodiments an EPIC synthesis system also includes a system controller having instructions for controlling process operations in accordance with the disclosed embodiments. The system controller may include one or more memory devices and one or more processors configured to execute the instructions so that the system will perform methods in accordance with the disclosed embodiments. Machine-readable media containing instructions for controlling process operations in accordance with the disclosed embodiments may be coupled to the system controller. FIG. 1A shows an example system 300 including a system controller 302 in electrical communication with and configured to execute instructions for an EPIC synthesis system 304.

All of the methods described herein can be performed using the system 200 or similar embodiments of the system 200.

Figure 2:
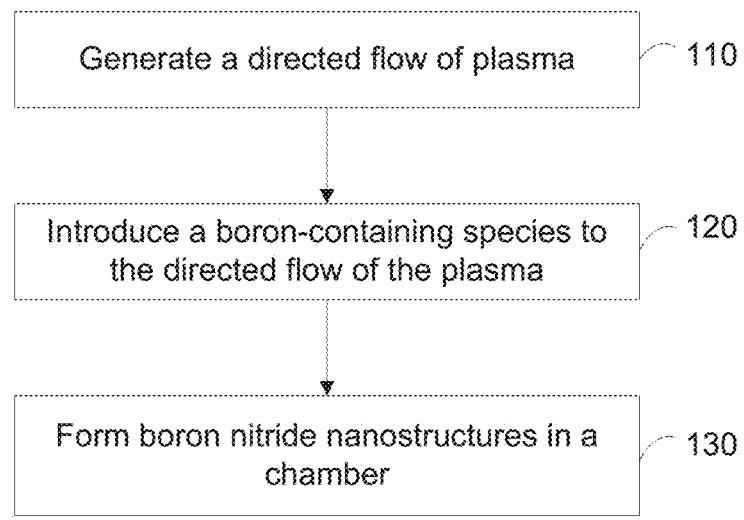
FIG. 2 shows an example of a flow diagram illustrating a method for fabricating boron nitride nanostructures.

FIG. 2 shows an example of a flow diagram illustrating a method for fabricating boron nitride nanostructures. Starting at block 110 of the method 100 shown in FIG. 2, a directed flow of plasma is generated.

In some embodiments, the directed flow of the plasma is generated using a plasma-generating torch. A plasma-generating torch may also be referred to as a plasma arc or a plasma gun. In some embodiments, the plasma-generating torch is an inductively coupled plasma-generating torch. In some embodiments, the plasma-generating torch is powered with a radio frequency (RF) power supply (e.g., a RF power supply with a power of about 60 kilowatts (kW) and a frequency of about 7 Hz). For example, to generate a directed flow of plasma with the laboratory-scale embodiment of the EPIC synthesis system, the nitrogen flow rate may be about 25 liters per minute (liters/min) to about 75 liters/min, about 40 liters/min to about 60 liters/min, or about 50 liters/min, and the RF power may be about 40 kW to about 50 kW.

In some embodiments, nitrogen, argon, hydrogen, or mixtures thereof are used to generate the directed flow of the plasma. In some embodiments, nitrogen (i.e., nitrogen gas) is used to generate the directed flow of the plasma. In some embodiments, nitrogen gas only is used to generate the directed flow of the plasma. In some embodiments, substantially nitrogen gas (i.e., nitrogen gas that may include impurities, such as water) only is used to generate the directed flow of the plasma. In some embodiments, at least 50% of the gas used to generate the plasma is nitrogen gas. In some embodiments, at least 90% of the gas used to generate the plasma is nitrogen gas. In some embodiments, at least 95% of the gas used to generate the plasma is nitrogen gas.

At block 120, a boron-containing species is introduced to the directed flow of the plasma. In some embodiments, the boron-containing species includes hexagonal boron nitride powder. In other embodiments, the boron-containing species does not include hexagonal boron nitride powder. In some embodiments, the boron-containing species includes boron powder. In some embodiments, the boron-containing species includes only boron powder. In some embodiments, the boron-containing species includes amorphous boron powder or only amorphous boron powder. In some embodiments, the boron-containing species includes crystalline boron powder or only crystalline boron powder.

Other precursors also can be used to fabricate boron nitride nanostructures. For example, in some embodiments, the boron-containing species comprises an oxide of boron or an acid of boron. In some embodiments, the oxide of boron is selected from a group consisting of boron trioxide ($B_2O_3$) and diboron dioxide ($B_2O_2$). In some embodiments, the acid of boron comprises boric acid ($H_3BO_3$). In some embodiments, the boron-containing species as a gas, such as diborane gas or boron trichloride gas.

In some embodiments, the boron-containing species comprises a powder and is introduced to the directed flow of the plasma using a carrier gas. In some embodiments, nitrogen is used as the carrier gas. Both the nitrogen in the directed flow of the plasma and the nitrogen in the carrier gas may react with boron from the boron-containing species to form boron nitride nano structures.

In some embodiments, blocks 110 and 120 may be considered to occur simultaneously. For example, when the boron-containing species and the gas used to generate the directed flow of the plasma (i.e., the plasma gas) are fed into the plasma-generating torch 205 simultaneously through the same port, the directed flow of the plasma may be generated as the boron-containing species are introduced to the directed flow of the plasma.

At block 130, boron nitride nanostructures are formed. In some embodiments, the boron nitride nanostructures form due to cooling of the directed flow of the plasma. In some embodiments, the boron nitride nanostructures form in a chamber, such as chamber 220 described above. In some embodiments, boron nitride nanostructures form on the interior walls of the chamber. In some embodiments, boron nitride nanostructures form throughout the chamber. In some embodiments, the materials are collected on a removable jacket inside the chamber. In some embodiments, the materials are collected using the methods described above (e.g., opening the chamber or an in-situ pressure-purge extraction cycle). In some embodiments, the boron nitride nanostructures comprise or are selected from a group consisting of nanotubes, nanoribbons, nanococoons (e.g., closed shell capsules of boron nitride), and nanosheets. A boron nitride nanoribbon may be defined as one-dimensional sheet of boron nitride having nanometer scale dimensions in thickness and width and a length on the order of microns. A boron nitride nanosheet may be defined as a hexagonal boron nitride crystal having dimensions along the c-axis of the crystal of about 50 nm to 150 nm, about 100 nm, or less than about 1 micron, and having dimensions along the a-axis and the b-axis of the crystal on the order of microns.

In some embodiments, a pressure (e.g., a nitrogen pressure) in the chamber is about 0.5 to about 1.5 atmosphere (atm), for example about 1 atm. A nitrogen pressure of about 0.5 to about 1.5 atm may aid in the formation of boron nitride nanococoons (i.e., a shell of boron nitride surrounding a boron particle or a boron nitride nanostructure surrounding a boron particle). In some embodiments, a pressure (e.g., a nitrogen pressure) in the chamber is about 1.5 to about 2.5 atm, for example about 2 atm. A nitrogen pressure of about 1.5 to about 2.5 atm may aid in the formation of boron nitride nanoribbons (i.e., a collapsed boron nitride nanotube, flattened into a ribbon or sheet of boron nitride). As the plasma-generating torch used to generate the directed flow of the plasma may enclose a portion of the chamber, the pressure (e.g., the nitrogen pressure) may be at these pressure levels during blocks 110, 120, and 130 of the method 100.

In some embodiments, a pressure (e.g., a nitrogen pressure) in the chamber is about 3 atm or greater. In some embodiments, a pressure (e.g., a nitrogen pressure) in the chamber is between 3 atm and 100 atm. In some embodiments, a pressure (e.g., a nitrogen pressure) in the chamber is between 3 atm and 10 atm. A nitrogen pressure of about 3 atm or greater may aid in the formation of boron nitride nanotubes. In some embodiments, a pressure (e.g., a nitrogen pressure) in the chamber is between 1 atm and 100 atm. In some embodiments, a pressure (e.g., a nitrogen pressure) in the chamber is between 2 atm and 10 atm. As the plasma-generating torch used to generate the directed flow of the plasma may enclose a portion of the chamber, the pressure (i.e., the nitrogen pressure) may be at these pressure levels during blocks 110, 120, and 130 of the method 100.

In some embodiments, a percentage of the boron nitride nanostructures that are nanotubes is about 90% or greater. For example, when the pressure in the chamber is about 3 atm or higher, nanotubes may comprise about 90% or more of the boron nitride nanostructures. Pressures above about 3 atm may generate larger percentages of boron nitride nanotubes. In some embodiments, a percentage of the boron nitride nanostructures that are nanotubes is about 50% or greater.

In some embodiments, a catalyst may be used to fabricate the boron nitride nanostructures. For example, a catalyst may be introduced to the directed flow of the plasma at block 120. Generally, a catalyst is a substance that may be used to increase the rate of a chemical reaction without being consumed by the reaction. Some metal catalysts that have been used to fabricate boron nitride nanostructures include magnesium and tungsten; these catalysts are generally present in small amounts. For example, a catalyst may be present in an amount of less than about 1%, by atomic ratio, of boron and nitrogen. In some embodiments, hydrogen may be used to aid in the formation of boron nitride nanostructures; hydrogen may be considered a catalyst in these instances. For example, hydrogen, in part, may be used to generate the plasma, and may also serve to aid in the formation of boron nitride nanostructures. In some embodiments, hydrogen may be introduced to the directed flow of the plasma.

In some embodiments, boron nitride nanostructures are formed without the use of a catalyst. In some embodiments, boron nitride nanostructures are formed without the use of a metal catalyst. In some embodiments, boron nanostructures are formed without the use of hydrogen. For example, pressures of 1 atm or greater when forming boron nitride nanostructures may obviate any need to use a catalyst or hydrogen in a boron nitride nanostructure fabrication process.

In some embodiments, the chamber is actively cooled during blocks 110, 120, and 130. For example, the chamber may be actively cooled using water. In some embodiments, the amount that the chamber is cooled can be adjusted to adjust the cooling rate of the directed flow of the plasma. In some embodiments, the cooling rate of the directed flow of the plasma determines, in part, the type of boron nitride nanostructures that are formed.

In some embodiments, a structure may be placed in the chamber such that the directed flow of the plasma impinges the structure. This may cool the plasma rapidly and allow for the synthesis of desired boron nitride nanostructures. Also, boron nitride nanostructures may form on the structure. For example, the structure may include surfaces, wires, meshes, or screens positioned in the chamber so that the directed flow of the plasma impinges the structure. In some embodiments, the structure may be actively cooled while performing the method 100. For example, the structure may be actively cooled with water.

In some embodiments, the method further comprises introducing a carbon-containing species to the directed flow of the plasma. In some embodiments, the carbon-containing species is selected from a group consisting of amorphous carbon, carbon black, graphite, carbon nanotubes, graphene, and graphite oxide. In some embodiments, the carbon-containing species are used when the boron-containing species comprises an oxide of boron or an acid of boron.

In some embodiments using a carbon-containing species, the directed flow of the plasma is generated with nitrogen, argon, hydrogen, and mixtures thereof. In some embodiments, the directed flow of the plasma is generated with nitrogen (i.e., nitrogen gas). In some embodiments, the directed flow of the plasma is generated with nitrogen gas only. In some embodiments, the directed flow of the plasma is generated with substantially nitrogen gas (i.e., nitrogen gas that may include impurities) only.

In some embodiments, the boron-containing species and the carbon-containing species are introduced to the directed flow of the plasma as a mixture. For example, the mixture of the boron-containing species and the carbon-containing species could be introduced to the directed flow of the plasma through one of the ports 206, 207, or 208 of the plasma-generating torch 205 of the system 200. In some embodiments, the boron-containing species and the carbon-containing species are physically separated from one another when introduced to the directed flow of the plasma. That is, the boron-containing species and the carbon-containing species are not a mixture when each species is introduced to the directed flow of the plasma. For example, one of the species could be introduced to the directed flow of the plasma through the port 206, and the other of the species could be introduced to the directed flow of the plasma through the port 207 of the plasma-generating torch 205 of the system 200.

In some embodiments, when the boron-containing species comprising an oxide of boron or an acid of boron and the carbon-containing species are introduced to the directed flow of the plasma, a catalyst is also introduced to the directed flow of the plasma. In such embodiments, a catalyst is used to fabricate the boron nitride nanostructures. In some embodiments, the catalyst comprises magnesium (Mg), iron (Fe), nickel (Ni), cobalt (Co), yttrium (Y), lithium (Li), copper (Cu), lithium oxide (LiO), and/or calcium oxide (CaO). In some embodiments, the catalyst is mixed with the boron-containing species, the carbon-containing species, or both. In some embodiments, the catalyst is not mixed with the boron-containing species or the carbon-containing species when it is introduced to the directed flow of the plasma. In some embodiments, when the boron-containing species comprising an oxide of boron or an acid of boron and the carbon-containing species are introduced to the directed flow of the plasma, a catalyst is not introduced to the directed flow of the plasma. In such embodiments, a catalyst is not used to fabricate the boron nitride nanostructures.

While not wanting to be bound by any theory, the reaction when the boron-containing species comprising an oxide of boron or an acid of boron and the carbon-containing species are introduced to the directed flow of the plasma is:

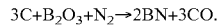

$$3C + B_2O_3 + N_2 \rightarrow 2BN + 3CO.$$

Other compositions of nanostructures may also be fabricated using the EPIC synthesis system 200 and other embodiments of the method 100. For example, boron carbon nitrogen ($B_xC_yN_z$) nanostructures (including nanotubes, nanoribbons, nanococoons, and nanosheets) may be fabricated using a method similar to the method 100 by adding a carbon-containing species to the directed flow of the plasma. In some embodiments, transition metals (e.g., iron, nickel, and copper) may be used as a catalyst in the formation of BCN nanostructures. In some embodiments, BCN nanostructures may be formed without the use of a catalyst.

Examples

The following examples are intended to be examples of the embodiments disclosed herein, and are not intended to be limiting.

Methods of fabricating BNNTs with a laboratory-scale EPIC synthesis system can generate high quality materials at production rates of about 35 g/hour. In the examples below, no quench wires or screens were used, the plasma gas was pure nitrogen injected via the port 206 of the system 200 shown in FIG. 1, and the boron feedstock was either hexagonal BN (hBN) powder (e.g., −325 mesh) or amorphous boron powder (e.g., −325 mesh) delivered by a nitrogen carrier gas. The process was performed without use of a catalyst. Both types of boron feedstock successfully produced BNNTs (and with suitable parameter adjustment, other BN nanomaterials). A higher conversion rate was achieved with amorphous boron powder. Nitrogen as the carrier gas (e.g., at about 2 liters/min to 5 liters/min) was used to propel the powder radially into the plasma plume via port 207 of the system 200 near the torch nozzle at pressures varying from about 14.7 psia to 75 psia (psi absolute), with boron injection rates of about 100 mg/min to 1700 mg/min. Nitrogen flowing at about 50 liters/min served as the plasma gas with the plasma power maintained at about 40 kW to 50 kW. Experiments were typically of duration of about ten minutes to one hour.

With amorphous boron at 246 mg/min, carrier gas $N_2$ at 2.5 l/m, plasma gas $N_2$ at 50 l/m, and 40 kW plasma at 30 psia, the EPIC synthesis system immediately generated fibrous, light-colored, cotton-candy web-like material which soon occupied the entire cross-sectional area of the chamber. The material initially accumulated in the upper half of the chamber (i.e., near the torch hot zone), and, as the run continued, the chamber got successively packed, filling a volume of 10 liters (i.e., half the total chamber volume) in approximately 30 minutes. In conjunction with fibrils packing the interior volume of the chamber, the chamber walls typically also became coated in a similarly light colored material, which was easily peeled off as a continuous felt-like film. Often the fibril and felt materials had an overall light grayish color, which on closer inspection revealed itself as pure-white cottony patches dispersed among grayish material. Compressed BNNT fibril material (e.g., from a 15 minute synthesis run) filled a one-liter glass jar. The material was composed largely of double-wall BNNTs.

The fibril cotton-candy-like and felt-like sheet material was characterized. Over a broad range of synthesis conditions, both were composed predominantly of pure BNNTs with wall number ranging from two to six, with the most common being double-wall tubes of outer diameter ~4 nm similar to those observed using other BNNT synthesis techniques. The grayish color originated from dark specks of unreacted boron not incorporated into the pure-white (or rather transparent) tubes, and could be removed by treatment in a nitric acid solution.

For the boron nitride material characterized in FIGS. 3-6, the following parameters were used to generate the material: amorphous boron at 150 mg/min; carrier gas $N_2$ at 2.5 l/m; plasma gas $N_2$ at 50 l/m; 40 kW plasma at 45 psia.

The nanoscopic morphology and purity of the BNNT-containing material were observed using scanning electron microscopy (SEM) with energy dispersive x-ray analysis (EDAX) capability and transmission electron microscopy (TEM, operating at 80 kV). Element-sensitive electron energy loss spectroscopy (EELS) was performed using a TEM operated at 200 kV. Raman spectra were collected on a spectrometer using a 514 nm excitation laser.

Figure 3A:
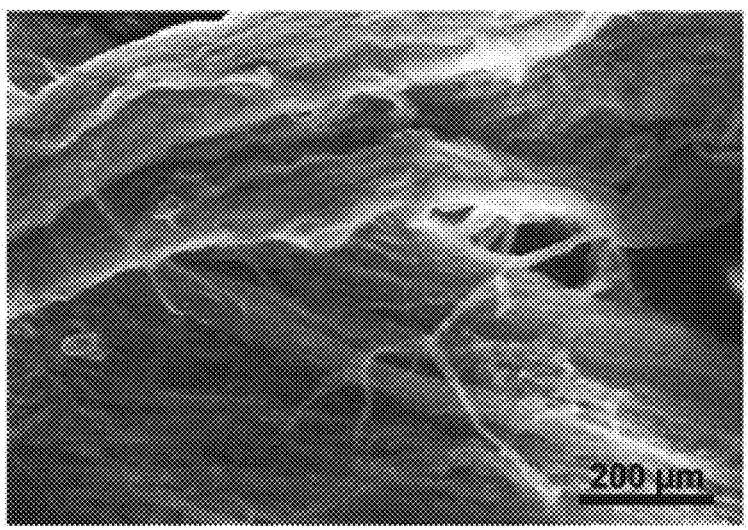
FIGS. 3A-3C show examples of SEM images of as-synthesized BNNTs obtained from fibril-like material near the center of the chamber.
Figure 3B:
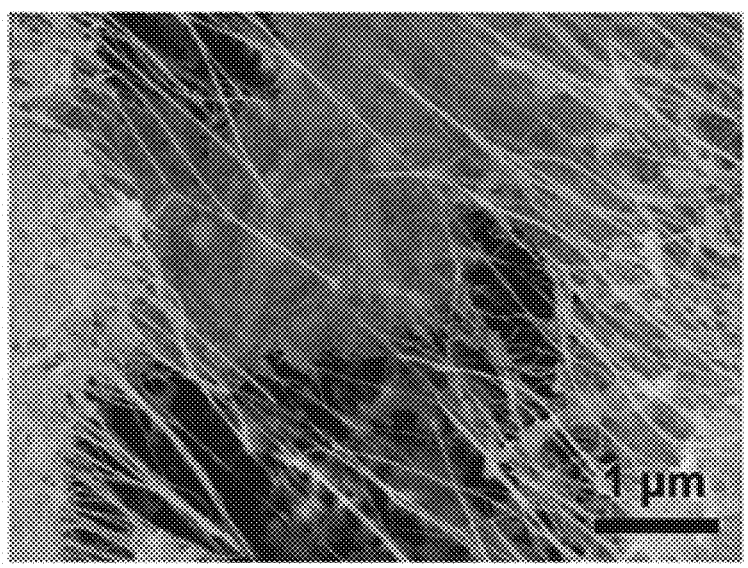
Figure 3C:
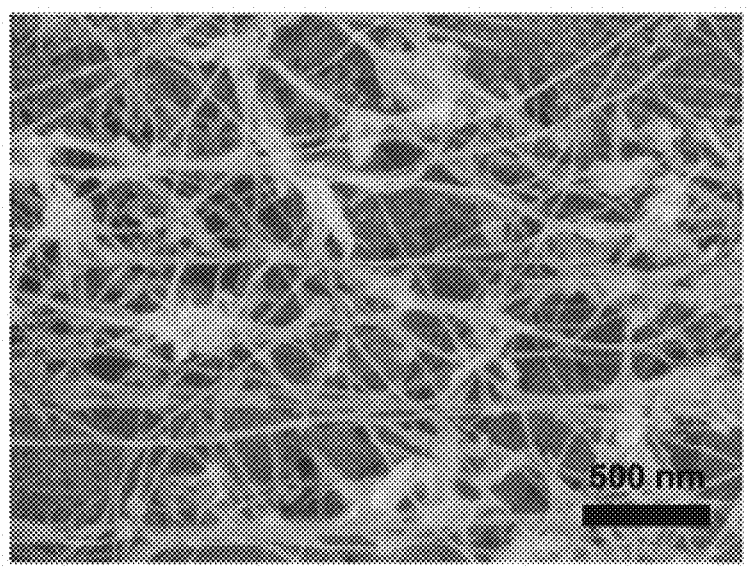

FIGS. 3A-3C show characteristic SEM images of the fibril-like material removed from the center of the chamber. The low-density spongy material consisted of millimeter to centimeter (or longer) whispy fiber bundles, with rough macroscopic alignment of the fibrils (FIG. 3A). At higher magnification (FIGS. 3B and 3C) the fibrils are seen to be composed of individual nanotubes (identified as pure BNNTs). This and related imaging shows that the tubes have lengths exceeding tens of microns. At the zoomed in scale (FIG. 3C) the origin of the grayish patches of the bulk material was revealed as unreacted nanoscale particles of solid boron (identified by EDAX) interspersed among the pure tubes and fibrils.

High resolution TEM images of individual BNNTs within the fibrils are presented in FIGS. 4A and 4B. FIG. 4A shows a typical BNNT bundle (e.g., in this micrograph, double-wall BNNTs), while FIG. 4B shows details of individual tubes. In FIG. 4B, tubes with wall number, n, ranging from two to six are shown, with outer diameters, indicated by d, spanning 4 nm to 6 nm. The TEM analysis verified the hollow, tubular nature of the BNNTs. Counting tubes in multiple TEM sessions showed that the majority of the BNNTs were double walled (70%) with the next most predominant being triple walled (20%); this 90% distribution has diameters ranging from 2 nm to 6 nm. The majority of the remaining 10% of the BNNTs were multiwall nanotubes with wall number n≥3, with only a very sparing amount of n=1 nanotubes. The multiwall BNNTs were generally highly crystalline with straight walls with no "bamboo" or "Dixie-cup" like defects. The high crystallinity of the as-synthesized BNNTs was reconfirmed in selected area electron diffraction. The structural quality of the tubes was significantly higher than that seen for most other BNNT synthesis techniques and is comparable to that for BNNTs produced by the laser vaporization method.

Figure 5:
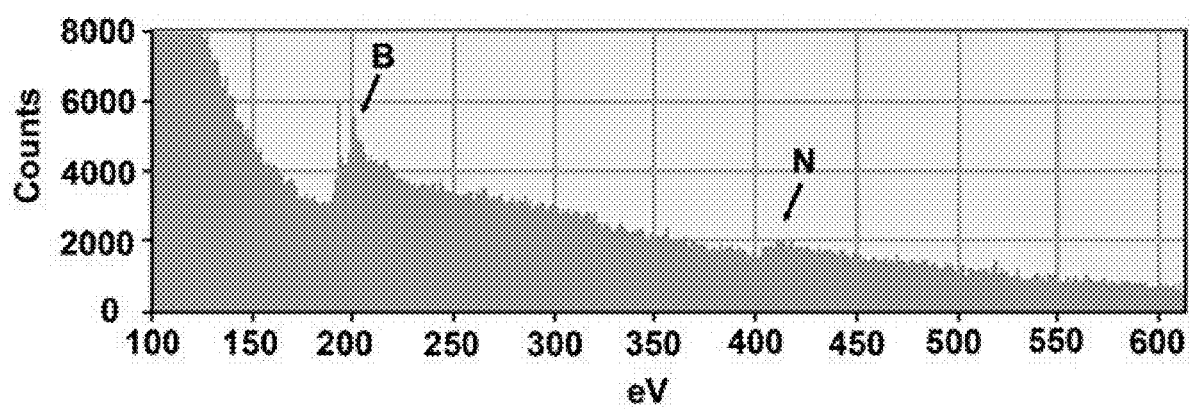
FIG. 5 shows an example of electron energy loss spectroscopy (EELS) for a BNNT produced by EPIC synthesis.
Figure 6:
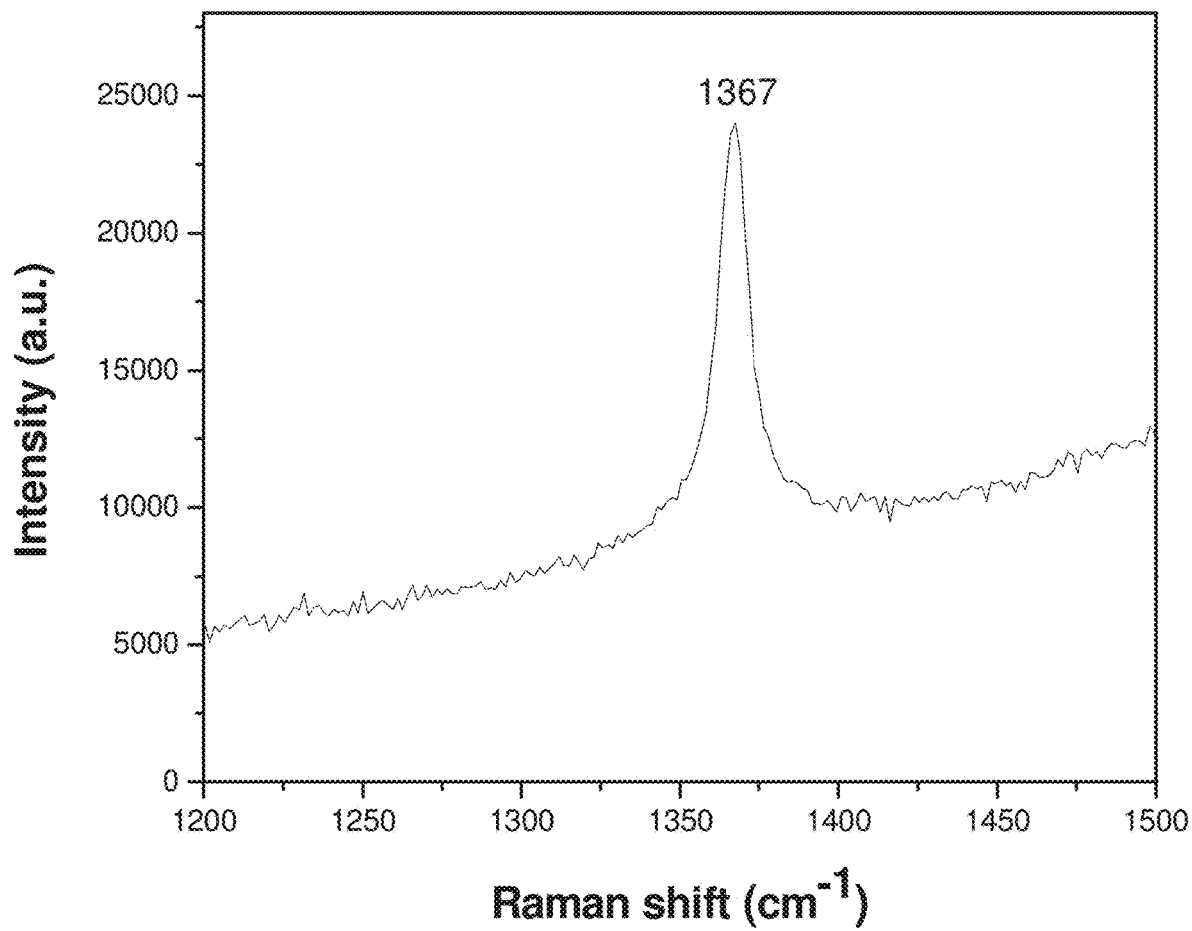
FIG. 6 shows an example of a Raman spectrum of a BNNT produced by EPIC synthesis.

FIG. 5 shows an EELS spectrum from a BNNT collected from the fibril region. Prominent boron and nitrogen peaks with $sp^2$-hybridization signatures were clearly observed, yielding an atomic B/N ratio of 1.0/0.8, in agreement (considering experimental uncertainties) with the expected 1/1 atomic ratio for pure BNNTs. FIG. 6 shows a Raman spectrum for a BNNT, again collected from the fibril, chamber-center region. The peak at 1367 cm$^{-1}$ is attributable to the $E_{2g}$ vibration mode of $sp^2$-bonded BNNTs. The sharpness of the peak (FWHM is 11 cm$^{-1}$) indicates highly crystalline "graphitic" BN.

The EPIC synthesis system displays great versatility for tuning synthesis conditions. Variable pressure, carrier gas, feedstock type, and injection rate of the feedstock all provide for a unique environment to grow not only high quality high aspect ratio BNNTs, but also other BN-based nanostructures. The experimental conditions under which various BN nanomaterials are synthesized can also elucidate the ways in which the nanostructures are formed. By tuning the reaction parameters, various forms of BN nanostructures can be targeted.

For BNNTs synthesis from pure boron and nitrogen, the overall reaction is $$2B+N_2 \rightarrow 2BN$$

Figure 7A:
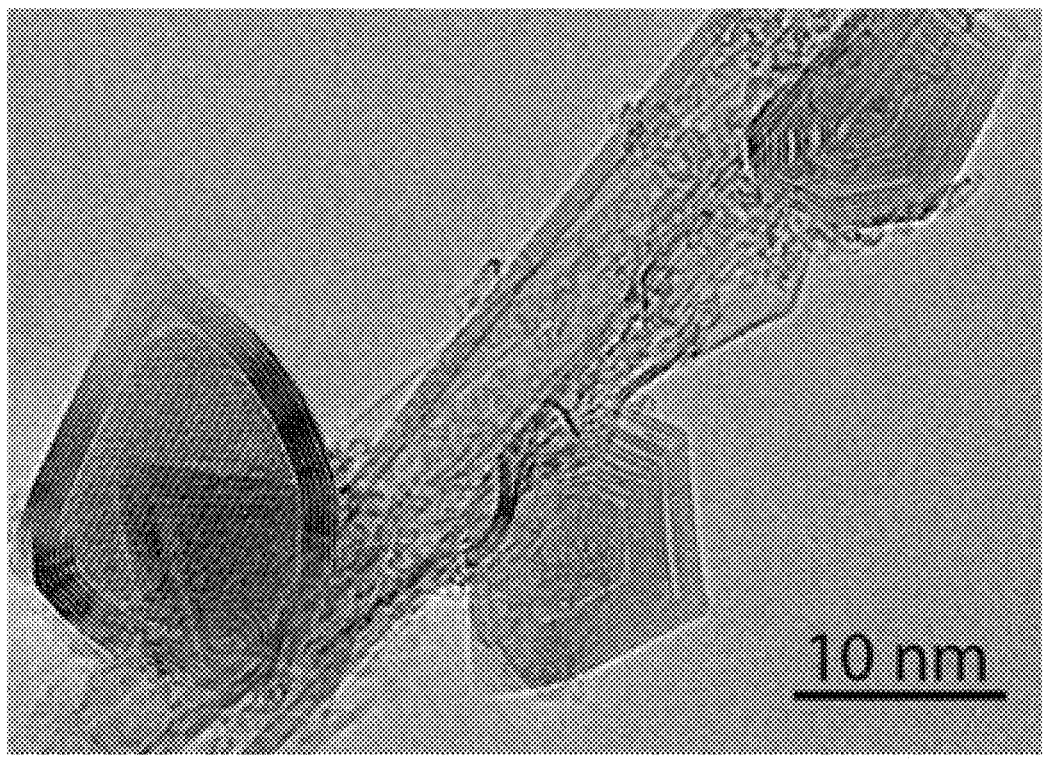
FIG. 7A shows an example of a TEM image of boron nitride nanococoons, filled with boron.

This reaction rate is expected to increase under high pressure of nitrogen, and indeed that is what was observed with the EPIC synthesis system. At 1 atm pressure, while some BNNTs were formed, there was also a considerable amount of boron that has not completely reacted with nitrogen to form BN. In this case there can be a shell, or nanococoon, of BN around the boron particles. FIG. 7A shows examples of boron-filled BN nanococoons so produced with no post-processing. For the material in FIG. 7A, the following synthesis conditions were used: amorphous boron at 150 mg/min, carrier gas $N_2$ at 2.5 l/m, plasma gas $N_2$ at 50 l/m, and 40 kW plasma at 25 psia.

At pressures above 2 atm, the concentration of these nanococoons began to decrease and, at 3 atm and above, they composed a very small fraction of the resulting product. While this indicates that high pressure nitrogen environments can assist high purity BNNT synthesis, it also hints at the mechanism of BNNT formation: as boron is injected into the plasma plume, it becomes a molten droplet. The surface of this droplet reacts with the nitrogen while within and as it exits the plasma plume. Higher pressure of nitrogen increases the energy density of the plasma plume and the collision rate of nitrogen atoms with the boron droplet, and thereby shifts the reaction toward BN in Equation 1. When the nitrogen pressure is relatively low, the boron does not react completely, thus enabling BN nanococoons. As the nitrogen pressure increases, the boron droplet completely reacts forming mostly BNNTs. Hence, the EPIC synthesis system allows tailoring of BN-based nanoparticle growth, and thereby various forms of non-nanotube BN nanostructures can be produced in significant quantities (though in preliminary studies, not yet exclusively).

Along similar lines, under appropriate synthesis conditions the EPIC synthesis system can also form a large fraction of collapsed BNNTs. For carbon nanotubes, it has been shown that for some types of nanotubes (e.g., few enough wall number and large enough diameter), the more stable configuration for a nanotube is not the conventional "inflated" tube of circular cross-section, but rather a "collapsed" or flattened tube where the tube now resembles more a ribbon. Collapsed carbon nanotube ribbons have been experimentally observed. Previous efforts have examined deformed BN nanostructures by high temperature metal-catalyzed reactions of BNNTs, and alkali-driven "unzipping" of BNNTs has yielded BN-based ribbons, but edge-free flattened-BN ribbons derived from unadulterated collapsed BNNTs have not been previously reported. These structures are of interest as the flattening is predicted to dramatically alter the electronic structure of the tube, allowing band gap engineering, and mechanically-modulated optoelectronic devices.

Figure 7B:
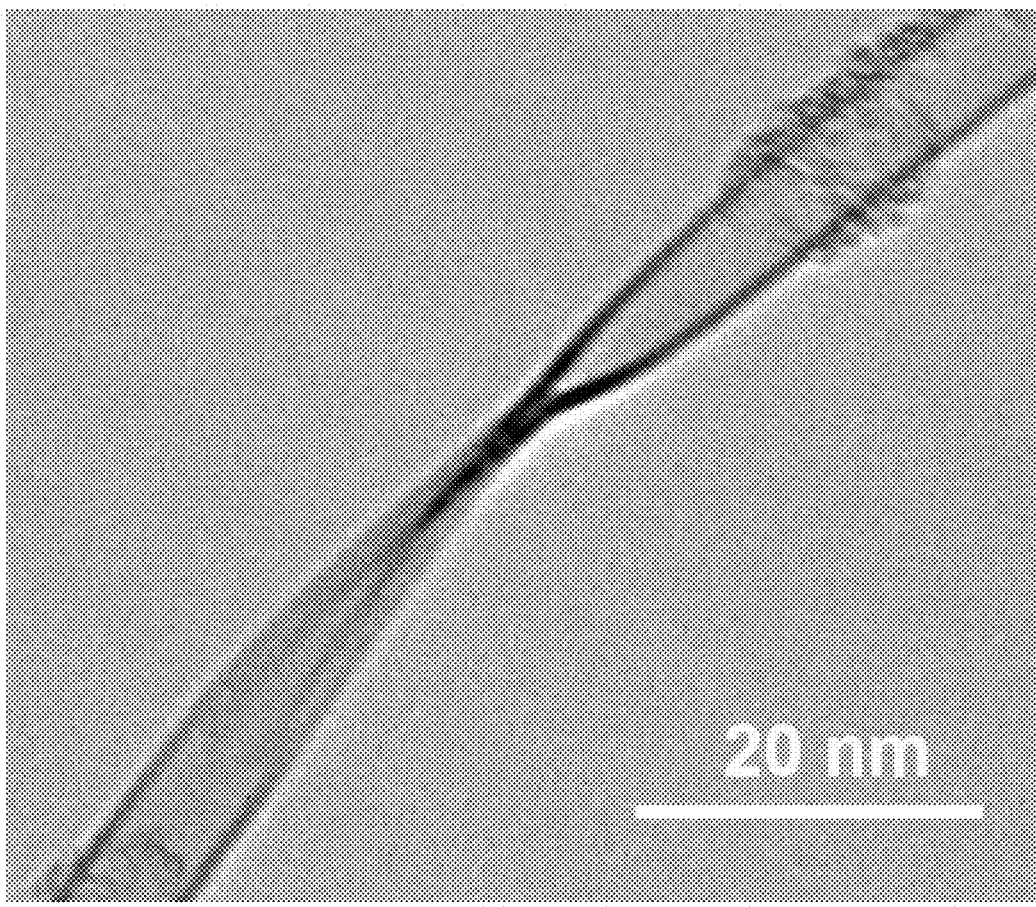
FIG. 7B shows an example of a TEM image of a twisted boron nitride nanoribbon derived from a flattened BNNT.

FIG. 7B shows a high-resolution TEM image of a collapsed BNNT, flattened into a twisted ribbon, produced by EPIC synthesis with no post-processing. For the material in FIG. 7B, the following synthesis conditions were used: amorphous boron at 150 mg/min, carrier gas $N_2$ at 2.5 l/m, plasma gas $N_2$ at 50 l/m, 40 kW plasma ramped from 15 to 45 psia.

CONCLUSION

In summary, a versatile, scalable, high-throughput synthesis method for the production of highly-crystalline, low-wall-number, high aspect ratio BNNTs has been demonstrated. The direct-injection EPIC synthesis system allows for a wide range of synthesis parameters, including catalyst-free BNNT production at a rate thus far of about 35 g/hour, nearly 300 times the production rate of the laser vaporization method. Additional BN-based nanostructures such as nanococoons and collapsed-tube nanoribbons are accessible. The EPIC synthesis method should find further application in other synthesis challenges, for example alloy $B_xC_yN_z$ nanotubes, and importantly other nanostructures containing elements in addition to or other than boron and nitrogen.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The following references are herein incorporated by reference.

REFERENCES

1. Chopra, N. G.; Luyken, R. J.; Cherrey, K.; Crespi, V. H.; Cohen, M. L.; Louie, S. G.; Zettl, A. *Science* 1995, 269, (5226), 966-967.
2. Rubio, A.; Corkill, J. L.; Cohen, M. L. *Phys Rev B* 1994, 49, (7), 5081-5084.
3. Iijima, S. *Nature* 1991, 354, (6348), 56-58.
4. Cohen, M. L.; Zettl, A. *Phys Today* 2010, 63, (11), 34-38.
5. Blase, X.; Rubio, A.; Louie, S. G.; Cohen, M. L. *Europhys Lett* 1994, 28, (5), 335-340.
6. Ishigami, M.; Sau, J. D.; Aloni, S.; Cohen, M. L.; Zettl, A. *Phys Rev Lett* 2005, 94, (5).
7. Jaffrennou, P.; Barjon, J.; Lauret, J. S.; Maguer, A.; Golberg, D.; Attal-Trétout, B.; Ducastelle, F.; Loiseau, A. *physica status solidi (b)* 2007, 244, (11), 4147-4151.

8. Chang, C. W.; Han, W. Q.; Zettl, A. *Appl Phys Lett* 2005, 86, (17).
9. Mele, E. J.; Král, P. *Phys Rev Lett* 2002, 88, (5), 056803.
10. Chen, X.; Wu, P.; Rousseas, M.; Okawa, D.; Gartner, Z.; Zettl, A.; Bertozzi, C. R. *J Am Chem Soc* 2009, 131, (3), 890-+.
11. Mickelson, W.; Aloni, S.; Han, W. Q.; Cumings, J.; Zettl, A. *Science* 2003, 300, (5618), 467-469.
12. Cumings, J.; Zettl, A. *Solid State Commun* 2004, 129, (10), 661-664.
13. Hilder, T. A.; Gordon, D.; Chung, S. H. *Small* 2009, 5, (19), 2183-2190.
14. Zhi, C.; Bando, Y.; Tang, C.; Honda, S.; Kuwahara, H.; Golberg, D. *Journal of Materials Research* 2006, 21, (11), 2794-2800.
15. Lahiri, D.; Hadjikhani, A.; Zhang, C.; Xing, T.; Li, L. H.; Chen, Y.; Agarwal, A. *Materials Science and Engineering: A* 2013, 574, (0), 149-156.
16. Cumings, J.; Zettl, A. *Chem Phys Lett* 2000, 316, (3-4), 211-216.
17. Golberg, D.; Bando, Y.; Eremets, M.; Takemura, K.; Kurashima, K.; Yusa, H. *Appl Phys Lett* 1996, 69, (14), 2045-2047.
18. Lourie, O. R.; Jones, C. R.; Bartlett, B. M.; Gibbons, P. C.; Ruoff, R. S.; Buhro, W. E. *Chem Mater* 2000, 12, (7), 1808-+.
19. Zhi, C. Y.; Bando, Y.; Tan, C. C.; Golberg, D. *Solid State Commun* 2005, 135, (1-2), 67-70.
20. Shimizu, Y.; Moriyoshi, Y.; Tanaka, H.; Komatsu, S. *Appl Phys Lett* 1999, 75, (7), 929-931.
21. Chen, Y.; Chadderton, L. T.; FitzGerald, J.; Williams, J. S. *Appl Phys Lett* 1999, 74, (20), 2960-2962.
22. Han, W. Q.; Mickelson, W.; Cumings, J.; Zettl, A. *Appl Phys Lett* 2002, 81, (6), 1110-1112.
23. Smith, M. W.; Jordan, K. C.; Park, C.; Kim, J. W.; Lillehei, P. T.; Crooks, R.; Harrison, J. S. *Nanotechnology* 2009, 20, (50).
24. Keun Su, K.; German, C.-S.; Christopher, T. K.; Matej, I.; Benoit, S.; Gervais, S. *Journal of Physics D: Applied Physics* 2007, 40, (8), 2375.
25. U.S. patent application Ser. No. 13/635,897, Zettl, A. K. Method and Device to Synthesize Boron Nitride Nanotubes and Related Nanoparticles.
26. Wu, J.; Han, W.-Q.; Walukiewicz, W.; Ager, J. W.; Shan, W.; Haller, E. E.; Zettl, A. *Nano Lett* 2004, 4, (4), 647-650.
27. Nemanich, R. J.; Solin, S. A.; Martin, R. M. *Phys Rev B* 1981, 23, (12), 6348-6356.
28. Terrones, M. *Ann. Rev. Mater. Res.* 2003, 33, 419-501.
29. Loiseau, A.; Willaime, F.; Demoncy, N.; Hug, G.; Pascard, H. *Phys Rev Lett* 1996, 76, (25), 4737-4740.
30. Chopra, N. G.; Zettl, A. *Solid State Commun* 1998, 105, (5), 297-300.
31. Tang, C.; Bando, Y.; Ding, X.; Qi, S.; Golberg, D. *J Am Chem Soc* 2002, 124, (49), 14550-14551.
32. Erickson, K. J.; Gibb, A. L.; Sinitskii, A.; Rousseas, M.; Alem, N.; Tour, J. M.; Zettl, A. K. *Nano Lett* 2011, 11, (8), 3221-3226.
33. Kim, Y. H.; Chang, K. J.; Louie, S. G. *Phys Rev B* 2001, 63, (20).
34. Miyamoto, Y.; Rubio, A.; Cohen, M. L.; Louie, S. G. *Phys Rev B* 1994, 50, (7), 4976-4979.
35. Weng-Sieh, Z.; Cherrey, K.; Chopra, N. G.; Blase, X.; Miyamoto, Y.; Rubio, A.; Cohen, M. L.; Louie, S. G.; Zettl, A.; Gronsky, R. *Phys Rev B* 1995, 51, (16), 11229-11232.

What is claimed is:

1. A system comprising:
a chamber, configured to contain a chamber pressure of about 3 atmospheres or greater;
an inductively coupled plasma-generating torch comprising a torch body, a nozzle, a top port, a first radial port, and a second radial port, wherein the top port is on a top portion of the torch body, wherein the first and second radial ports are positioned at a bottom portion of the torch body, and wherein the bottom portion of the torch body is attached to the chamber, wherein the inductively coupled plasma-generating torch is configured to contain a torch pressure of about 3 atmospheres or greater;
a power supply in electrical communication with the inductively coupled plasma-generating torch;
a top source comprising a gas composition, wherein the top source is in fluid communication with the top port;
a first source comprising a boron-containing species, wherein the first source is in fluid communication with the first radial port; and
a system controller, wherein the system controller is configured to:
generate a directed flow of plasma from the nozzle toward the bottom portion of the torch body using the gas composition;
radially introduce the boron-containing species through the first radial port into to the directed flow of the plasma downstream of the nozzle, wherein the directed flow of plasma is a fully formed and stable plume; and
continuously form a product selected from the group consisting of boron nitride nanostructures, boron-carbon-nitride nanostructures and combinations thereof in the chamber.

2. The system of claim 1, wherein the first radial port is positioned at a location adjacent to the directed flow of plasma.

3. The system of claim 1, wherein the first source further comprises a carbon-containing species.

4. The system of claim 1, wherein the second radial port is positioned at a location above the directed flow of plasma.

5. The system of claim 1, wherein the chamber includes a quench modifier.

6. The system of claim 5, wherein the quench modifier is selected from the group consisting of a wire, a mesh, or combinations thereof.

7. The system of claim 1, wherein the chamber further comprises at least one chamber port.

8. The system of claim 1, wherein the chamber is configured to contain a chamber pressure of between 3 atm and 100 atm.

9. The system of claim 1, wherein the chamber includes a chamber cooling system.

10. The system of claim 1, further comprising a second source comprising a plasma gas, wherein the second source is in fluid communication with the second radial port, and wherein the system controller is further configured to radially introduce the plasma gas through the second radial port such that the plasma gas travels from the bottom to the top of the torch body along an inner wall of the torch body and down through a center of the torch body.

11. A system comprising:
a chamber, configured to contain a chamber pressure of about 3 atmospheres or greater;
an inductively coupled plasma-generating torch comprising a torch body, a nozzle, a first port, and a bottom portion, wherein the bottom portion of the torch body is attached to the chamber, and wherein the inductively coupled plasma-generating torch is configured to contain a torch pressure of about 3 atmospheres or greater;

a power supply in electrical communication with the inductively coupled plasma-generating torch;

a source comprising a gas composition, wherein the source is in fluid communication with the first port;

a first source comprising a boron-containing species; and a system controller, wherein the system controller is configured to:

generate a directed flow of plasma from the nozzle toward the bottom portion of the torch body using the gas composition;

introduce the boron-containing species into to the directed flow of the plasma downstream of the nozzle, wherein the directed flow of plasma is a fully formed and stable plume; and continuously form a product selected from the group consisting of boron nitride nanostructures, boron-carbon-nitride nanostructures, and combinations thereof, in the chamber.

12. The system of claim 11, wherein the inductively coupled plasma-generating torch further comprises a first radial port and a second radial port, wherein the first and second radial ports are positioned at the bottom portion of the torch body.

13. The system of claim 12, wherein the first radial port is positioned at a location adjacent to the directed flow of plasma.

14. The system of claim 12, wherein the first source further comprises a carbon-containing species.

15. The system of claim 12, wherein the second radial port is positioned at a location above the directed flow of plasma.

16. The system of claim 11, wherein the chamber includes a quench modifier.

17. The system of claim 12, further comprising a second source comprising a plasma gas, wherein the second source is in fluid communication with the second radial port, and wherein the system controller is further configured to radially introduce the plasma gas through the second radial port such that the plasma gas travels from the bottom to the top of the torch body along an inner wall of the torch body and down through a center of the torch body.

* * * * *